United States Patent
Fujita

(10) Patent No.: US 6,383,672 B1
(45) Date of Patent: May 7, 2002

(54) TEMPERATURE REGULATOR FOR FUEL CELL

(75) Inventor: Nobuo Fujita, Toyota (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 09/547,079

(22) Filed: Apr. 11, 2000

(30) Foreign Application Priority Data

Apr. 28, 1999  (JP) .............................. 11-123033

(51) Int. Cl.$^7$ ................................ H01M 8/12
(52) U.S. Cl. ................. 429/26; 429/20; 429/24; 237/12.3 B; 165/297
(58) Field of Search ................ 429/20, 24, 26; 237/12.3 B; 165/297

(56) References Cited

U.S. PATENT DOCUMENTS 6,186,254 B1 * 2/2001 Mufford et al. ............ 180/65.3

FOREIGN PATENT DOCUMENTS

| JP | 6-260196 | 9/1994 | | |
|---|---|---|---|---|
| JP | 06260196 | * | 9/1994 | ............ H01M/8/04 |
| JP | 8-78033 | | 3/1996 | |

* cited by examiner

Primary Examiner—Carol Chaney
Assistant Examiner—Dah-Wei D. Yuan
(74) Attorney, Agent, or Firm—Oblon, Spivak, McClelland, Maier & Neustadt, P.C.

(57) ABSTRACT

When starting a fuel cell, valves are operated such that a heat exchange medium flows from a circulation pump through a heating-time bypass duct to a heater and the fuel cell, and the heat exchange medium is heated by the heater. Consequently, the fuel cell can be heated up efficiently and rapidly. When a heating device is driven during operation of the fuel cell, the valves are operated such that the heat exchange medium flows from the circulation pump to the fuel cell, the heater and the heat exchanger in this order. If the amount of heat required for the heating device cannot obtained from the heat generated by the fuel cell, the heater heats the heat exchange medium so as to remedy a deficiency in heat. As a result, the heating device can be made to function adequately. That is, the fuel cell is heated up rapidly when it is started. While the fuel cell is in operation, its temperature is confined to a suitable operational temperature range, whereby the heat generated by the fuel cell can be utilized effectively.

24 Claims, 7 Drawing Sheets

TEMPERATURE REGULATOR FOR FUEL CELL

INCORPORATION BY REFERENCE

The disclosure of Japanese Patent Application No. HEI 11-23033 filed on Apr. 28, 1999, including the specification, drawings and abstract is incorporated herein by reference in its entirety.

BACKGROUND OF THE INVENTION

1. Field of the invention

The present invention relates to a temperature regulator for a fuel cell and, more particularly, to a temperature regulator capable of regulating a temperature of a fuel cell and utilizing heat of the fuel cell.

2. Description of the Related Art

According to what is proposed in the related art of a temperature regulator for a fuel cell of the aforementioned type, a cooling system for the fuel cell is equipped with a heating device utilizing heat of the fuel cell and with a burner for heating a heat exchange medium in the cooling system (as disclosed, for example, in Japanese Patent Application Laid-Open No. HEI 6-260196).

This regulator has a circulation circuit through which the heat exchange medium respectively circulates through the fuel cell, the heating device and the burner. When the fuel cell is in normal operation, the heat generated by the fuel cell can be used to carry out heating. Also, when starting the fuel cell, this regulator can heat up the fuel cell by heating the heat exchange medium through the burner.

However, this regulator has a problem in that the heating device may not be able to produce a sufficient heating effect even if the fuel cell has been started and has become operable. The heat exchange medium heated by the burner is first sent to the fuel cell. Therefore, if the fuel cell is operable but not in normal operation, the amount of heat supplied to the heating device is insufficient. Also, this regulator has a problem in that the heating device is unable to function sufficiently when the amount of heat required for the heating device is greater than the amount of heat generated by the fuel cell. The burner may then be used to heat the heat exchange medium for the purpose of generating a required amount of heat. However, if the fuel cell is in normal operation, the heat exchange medium cannot be heated because of the necessity to cool the fuel cell.

SUMMARY OF THE INVENTION

It is an object of the temperature regulator for the fuel cell according to the present invention to rapidly heat up the fuel cell during the starting operation.

It is another object of the temperature regulator for the fuel cell according to the present invention to confine a temperature of the fuel cell during operation to a suitable operational temperature range.

It is yet another object of the temperature regulator for the fuel cell according to the present invention to effectively utilize the heat generated by the fuel cell.

It is yet another object of the temperature regulator for the fuel cell according to the present invention to remedy a deficiency in heat when effectively utilizing the heat generated by the fuel cell.

In order to achieve the above and other objects, according to a first aspect of the present invention, there is provided a temperature regulator for regulating a temperature of a fuel cell, including a circulation circuit through which a heat exchange medium exchanging heat with the fuel cell circulates, a medium circulator for circulating the heat exchange medium through the circulation circuit either in a normal direction or in a reverse direction, a cooler provided in the circulation circuit to cool the heat exchange medium, a cooling bypass device for switching the circulation circuit such that the heat exchange medium bypasses the cooler, a heat utilizer provided in the circulation circuit to carry out work utilizing heat of the heat exchange medium, a heat utilizing bypass device for switching the circulation circuit such that the heat exchange medium bypasses the heat utilizer, and a heater provided adjacent to the fuel cell in the circulation circuit and capable of heating the heat exchange medium.

In the temperature regulator for the fuel cell according to the first aspect of the present invention, the cooling bypass device can either incorporate the cooler into the circulation circuit or bypass the cooler, and the heat utilizing bypass device can either incorporate the heat utilizer into the circulation circuit or bypass the heat utilizer. Consequently, it is possible to regulate a temperature of the fuel cell and utilize the heat of the fuel cell. Also, since the heat exchange medium can be heated, it is possible to heat up the fuel cell or supplement an amount of heat required for the heat utilizer.

The temperature regulator for the fuel cell of the present invention may include a state detector for detecting a state of the fuel cell, and a controller designed to control the medium circulator, the cooling bypass device, the heat utilizing bypass device and the heater, based on the state detected by the state detector. In this construction, the fuel cell can be maintained in a desired state.

In the temperature regulator for the fuel cell according to the aspect of the present invention wherein the state detector and the controller are provided, the controller may be designed to control the cooling bypass device and the heat utilizing bypass device such that the circulation circuit bypasses the cooler and the heat utilizer when the state detector detects a starting state of the fuel cell, and the controller may be designed to control the heater such that the heat exchange medium is heated, and to control the medium circulator such that the heat exchange medium circulates through the circulation circuit according to the respective order of the heater and the fuel cell. In this construction, the fuel cell can be heated up rapidly.

Further, in the temperature regulator for the fuel cell according to the first aspect of the present invention wherein the state detector and the controller are provided, the controller may be designed to control the cooling bypass device and the heat utilizing bypass device so as to incorporate the cooler and/or the heat utilizer into the circulation circuit when the state detector detects an operable state of the fuel cell, and the controller may be designed to control the medium circulator such that the heat exchange medium circulates through the circulation circuit according to the respective order of the fuel cell, the heater and the cooler and/or the heat utilizer. In this construction, the fuel cell can be cooled, and it is possible to supplement heat if the amount of heat required for the heat utilizer is deficient. In the temperature regulator for the fuel cell according to this aspect of the present invention, the state detector may be provided with a temperature detector for detecting a temperature of the fuel cell, and the controller may be designed to control the medium circulator, the cooling bypass device, the heat utilizing bypass device and the heater such that the temperature detected by the temperature detector is confined to a predetermined temperature range. In this construction, the fuel cell can be operated within a predetermined temperature range.

In the temperature regulator for the fuel cell according to the aspect of the present invention wherein the fuel cell is operated within the predetermined temperature range, a heat utilizing state detector for detecting a state of the heat utilizer may be provided, and the controller may be designed to control the cooling bypass device, the heat utilizing bypass device and the heater, based on the state of the heat utilizer detected by the heat utilizing state detector. In this construction, the heat utilizer can be maintained in a desired state.

In the temperature regulator for the fuel cell according to the aspect of the present invention wherein the heat utilizing state detector is provided, the controller may be designed to control the heat utilizing bypass device so as to incorporate the heat utilizer into the circulation circuit when the heat utilizing state detector detects a state where the heat utilizer utilizes heat. In this construction, the heat utilizer can utilize heat effectively.

In the temperature regulator for the fuel cell according to the aspect of the present invention wherein the heat utilizer is incorporated into the circulation circuit, the heat utilizer may be provided with an information detector for detecting information on any excess and deficiency of a required amount of heat, and the controller may be designed to control the heater and the cooling bypass device based on the information detected by the information detector. In this construction, the heat utilizer can function adequately.

In the temperature regulator for the fuel cell according to the aspect of the present invention wherein the heat utilizer is provided with the information detector, the controller may be designed to control the heater such that the heat exchange medium is heated when the information detector detects information on a deficiency of the required amount of heat. In this construction, it is possible to supplement a required amount of heat.

Further, in the temperature regulator for the fuel cell according to the aspect of the present invention wherein the heat utilizer is provided with the information detector, the controller may be designed to control the heater such that the heat exchange medium is not heated when the information detector detects information on an excess of the required amount of heat. In this construction, it is possible to prevent the supply of an excessive amount of heat. In the temperature regulator according to this aspect of the present invention, the controller may be designed to control the cooling bypass device so as to incorporate the cooler into the circulation circuit when the information detector detects information on an excess of the required amount of heat, although the heater is controlled so as not to heat the heat exchange medium. In this construction, the heat utilizer can suitably utilize heat. Furthermore, in the temperature regulator according to this aspect of the present invention, the controller may be designed to control the cooling bypass device such that the circulation circuit bypasses the cooler prior to the heating of the heat exchange medium by the heater when the information detector detects information on a deficiency of the required amount of heat with the cooling bypass device being so controlled as to incorporate the cooler into the circulation circuit. In this construction, it is possible to utilize heat efficiently.

In the temperature regulator for the fuel cell of the present invention, the heat utilizer may be a heating device that carries out heating by exchanging heat with the heat exchange medium.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

Figure 1:
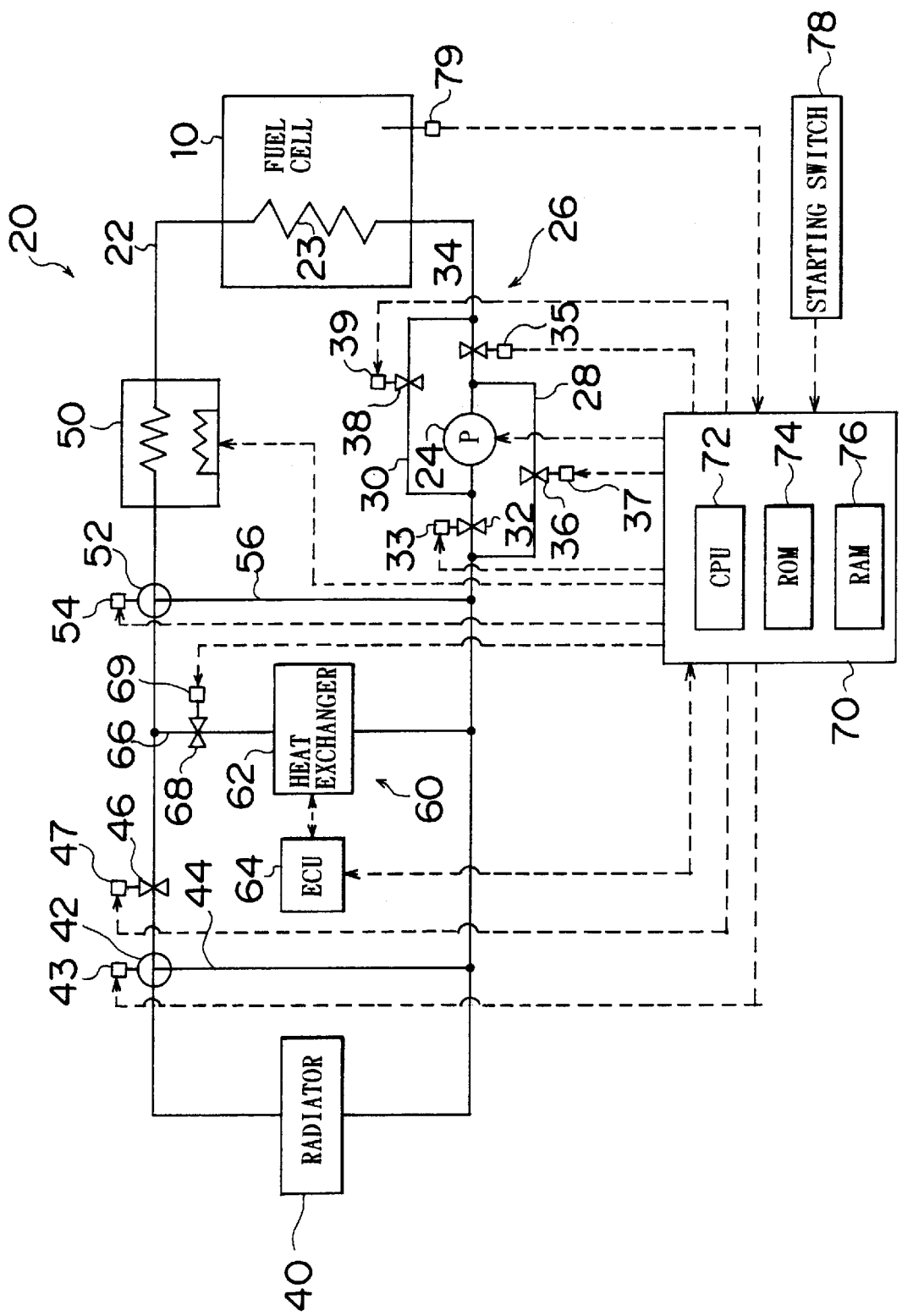
FIG. 1 is a structural view schematically showing a temperature regulator for a fuel cell according to one embodiment of the present invention.

A mode of implementation of the present invention will now be described based on an embodiment thereof. FIG. 1 is a structural view schematically showing a temperature regulator 20 for a fuel cell 10 according to one embodiment of the present invention. The temperature regulator 20 of the embodiment is designed to regulate a temperature of the fuel cell 10. As shown in FIG. 1, the temperature regulator 20 is equipped with a circulation duct 22 that constitutes a circuit of heat exchange medium such as water together with a heat exchange portion 23 for exchanging heat with the fuel cell 10, a circulation pump 24 for circulating the heat exchange medium through the circulation duct 22, a flow-direction switching mechanism 26 for switching a direction of flow of the heat exchange medium in the circulation duct 22, a radiator 40 for cooling the heat exchange medium with outside air, a heater 50 for heating the heat exchange medium, a heating device 60 for heating the vehicle passenger compartment using the heat of the heat exchange medium, and an electronic control unit 70 for controlling the entire regulator 20.

In the embodiment, the fuel cell 10 is designed as a polymer electrolyte fuel cell composed of a plurality of laminated single cells which employ a proton-conductive film made of a high-molecular material as an electrolyte. The fuel cell 10 operates at a temperature of about 70 to 110° C.

The circulation pump 24 is designed as a single-direction pump which cannot force-feed the heat exchange medium in the opposite direction (and which operates to force-feed the heat exchange medium from left to right in FIG. 1). The flow-direction switching mechanism 26 is composed of two electromagnetic valves 32 and 34 so disposed in the circulation duct 22 as to interpose the circulation pump 24 therebetween, a first bypass duct 28 for bypassing the electromagnetic valve 32 and the circulation pump 24, an electromagnetic valve 36 provided in the first bypass duct 28, a second bypass duct 30 for bypassing the circulation pump 24 and the electromagnetic valve 34, and an electromagnetic valve 38 provided in the second bypass duct 30. If the electromagnetic valves 32 and 34 are opened and the electromagnetic valves 36 and 38 are closed, the heat exchange medium flows through the circulation duct 22 in the order of the circulation pump 24, the fuel cell 10 and the heater 50, instead of flowing through the first bypass duct 28 and the second bypass duct 30. If the electromagnetic valves 32 and 34 are closed and the electromagnetic valves 36 and 38 are opened, the heat exchange medium flows from the heater 50 and the fuel cell 10 through the second bypass duct 30 into the circulation pump 24, and flows from the circulation pump 24 through the first bypass duct 28 toward the radiator 40.

The radiator 40 is designed as a heat exchanger for cooling the heat exchange medium with outside air. A three-way valve 42 provided in the circulation duct 22 can be set to cause the heat exchange medium to flow through the radiator 40 or through a radiator bypass duct 44. Also, an electromagnetic valve 46 designed as a radiator valve is disposed in the circulation duct 22. The electromagnetic valve 46 can close the circulation duct 22 so that that the heat exchange medium flows neither through the radiator 40 nor through the radiator bypass duct 44.

The heater 50, which is provided adjacent to the fuel cell 10, is designed as an electric heater that heats the heat exchange medium when supplied with electric power from a battery (not shown). The electronic control unit 70 performs on-off control of the heater 50. In the circulation duct 22, the heater 50 is disposed between the fuel cell 10 and a three-way valve 52, which makes it possible to bypass the radiator 40 and the heating device 60 with the aid of a heating-time bypass duct 56.

The heating device 60, which is a device for heating the vehicle passenger compartment using the heat of the heat exchange medium, is equipped with a heat exchanger 62 for exchanging heat with the heat exchange medium and with a heating-device electronic control unit 64 for controlling the heating device 60. The heating device 60 is also equipped with various sensors and components required to heat the passenger compartment, such as a hot-air outlet, a temperature sensor and a target temperature setting switch provided in the passenger compartment. However, since these sensors and components are irrelevant to the gist of the present invention, they will not be shown or described. A heat-supplying duct 66 for supplying the heat exchange medium to the heat exchanger 62 of the heating device 60 branches off from the circulation duct 22. An electromagnetic valve 68 is disposed in the heat-supplying duct 66.

The electronic control unit 70 is designed as a one-chip microprocessor that is mainly composed of a CPU 72. The electronic control unit 70 includes a ROM 74 where processing programs are stored, a RAM 76 for temporarily storing data, communication ports (not shown) for communication with the heating-device electronic control unit 64, and I/O ports (not shown). A temperature Tfc of the fuel cell 10 from a temperature sensor 79 attached to the fuel cell 10, a starting signal from a starting switch 78 that is turned on when the fuel cell 10 is started, and the like are inputted to the electronic control unit 70 through input ports. Driving signals to actuators 33, 35, 37, 39, 47 and 69 for the respective electromagnetic valves 32, 34, 36, 38, 46 and 68, driving signals to actuators 43 and 54 for the respective three-way valves 42 and 52, a driving signal to the heater 50, and the like are outputted from the electronic control unit 70 through output ports.

Figure 2:
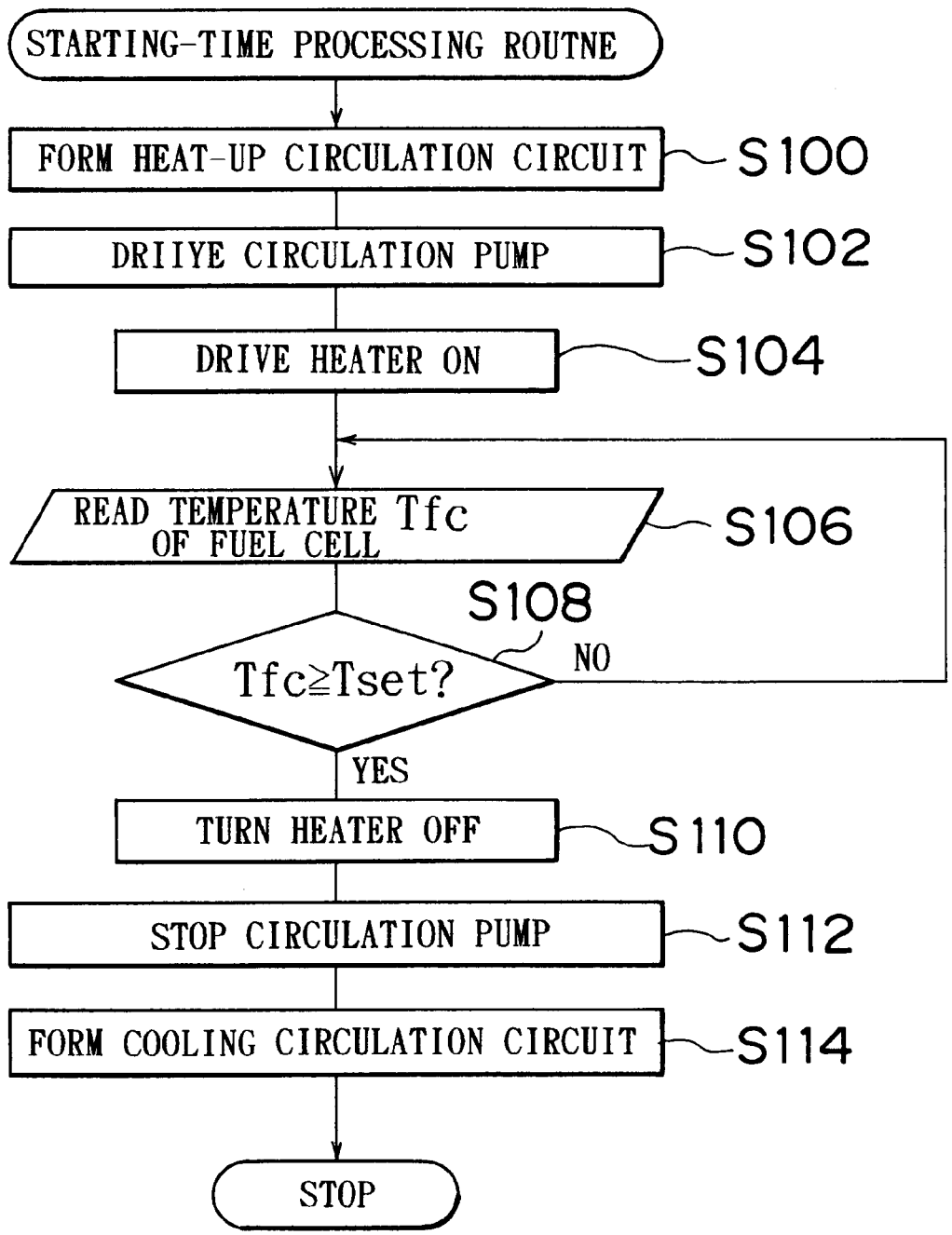
FIG. 2 is a flowchart showing one example of a starting-time processing routine that is carried out by an electronic control unit of the embodiment when the fuel cell is started.

Next, operation of the thus-constructed temperature regulator 20 of the embodiment, especially operation when the fuel cell 10 is started and when the heating is used in a normal running state will be described. FIG. 2 is a flowchart showing an example of a starting-time processing routine carried out by the electronic control unit 70 when the fuel cell 10 is started. This routine is carried out when the starting switch 78 is turned on and outputs a signal.

Figure 3:
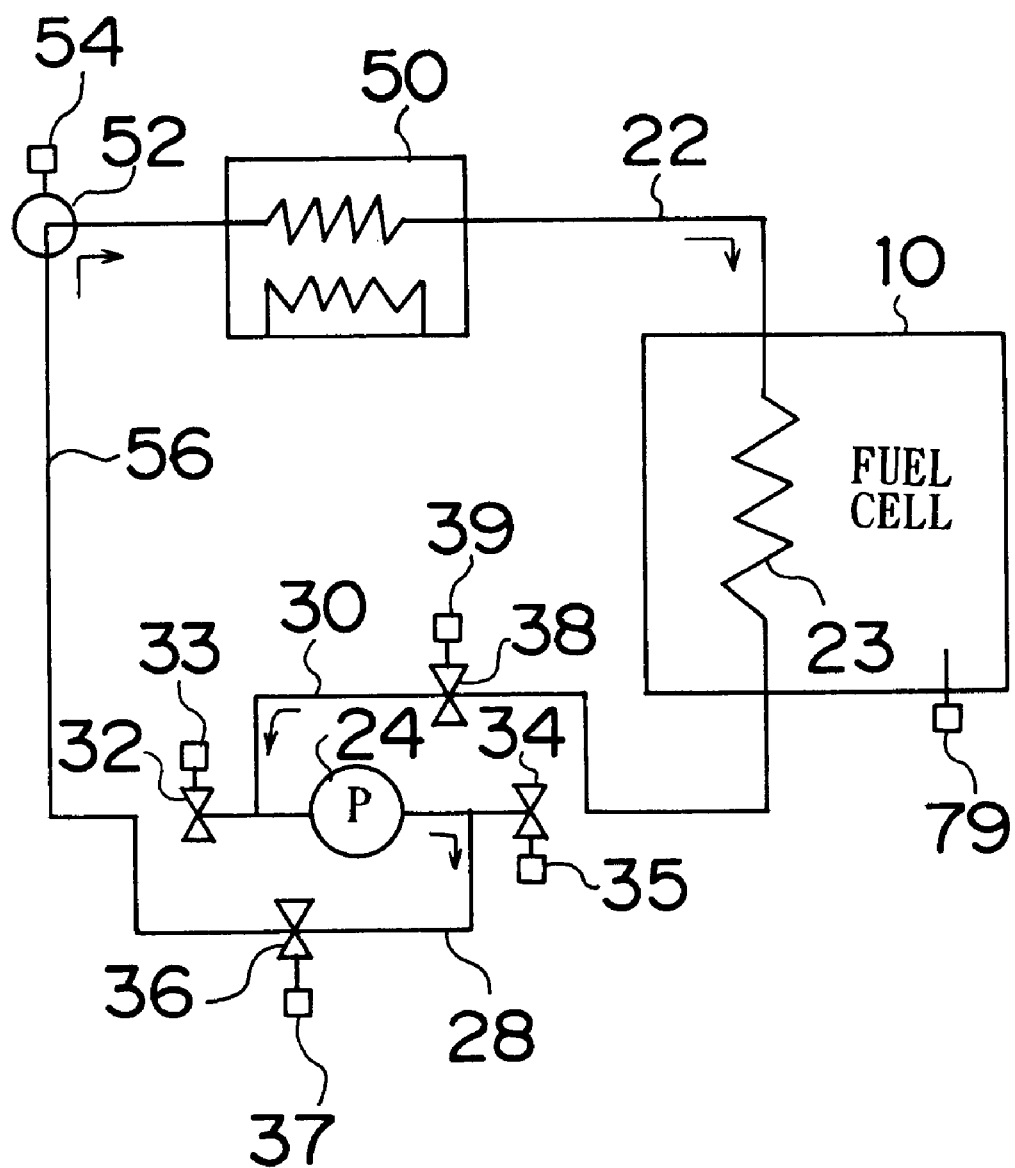
FIG. 3 is an explanatory view exemplifying how heat exchange medium flows when a heat-up circuit is formed.

If the starting-time processing routine is carried out, the CPU 72 of the electronic control unit 70 first performs a processing for forming a circulation duct (the heat-up circuit) for heating the fuel cell 10 (step S100). More specifically, the heat-up circuit is formed as follows. The electronic control unit 70 outputs a driving signal to the actuator 54 for the three-way valve 52 so that the heat exchange medium bypasses the radiator 40 and the heating device 60 and flows through the heating-time bypass duct 56. On the other hand, the electronic control unit 70 outputs driving signals to the actuators 33 and 35 for the electromagnetic valves 32 and 34 so as to close these valves, and outputs driving signals to the actuators 37 and 39 for the electromagnetic valves 36 and 38 so as to open these valves. Thus, the heat-up circuit is formed. FIG. 3 shows a state where the heat-up circuit is formed. As shown in FIG. 3, if the heat-up circuit is formed, the heat exchange medium force-fed by the circulation pump 24 flows through the first bypass circulation duct 28 and the heating-time bypass duct 56, reaches the heater 50 and the fuel cell 10, flows through the second bypass duct 30, and returns to the circulation pump 24.

Once the heat-up circulation circuit has thus been formed, the circulation pump 24 is then driven (step S102), and a processing for turning the heater 50 on is performed (step S104). Because of such a processing, the heat exchange medium heated in the heater 50 heats up the fuel cell 10 at the heat exchange portion 23 therein. A processing for waiting for a temperature Tfc of the fuel cell 10 detected by the temperature sensor 79 to become equal to or greater than a threshold value Tset is then performed (steps S106 and S108). The threshold value Tset is set to a temperature at which the fuel cell 10 can operate. As long as the fuel cell 10 can operate, the threshold value Tset need not be set to a temperature for a normal running state.

Figure 4:
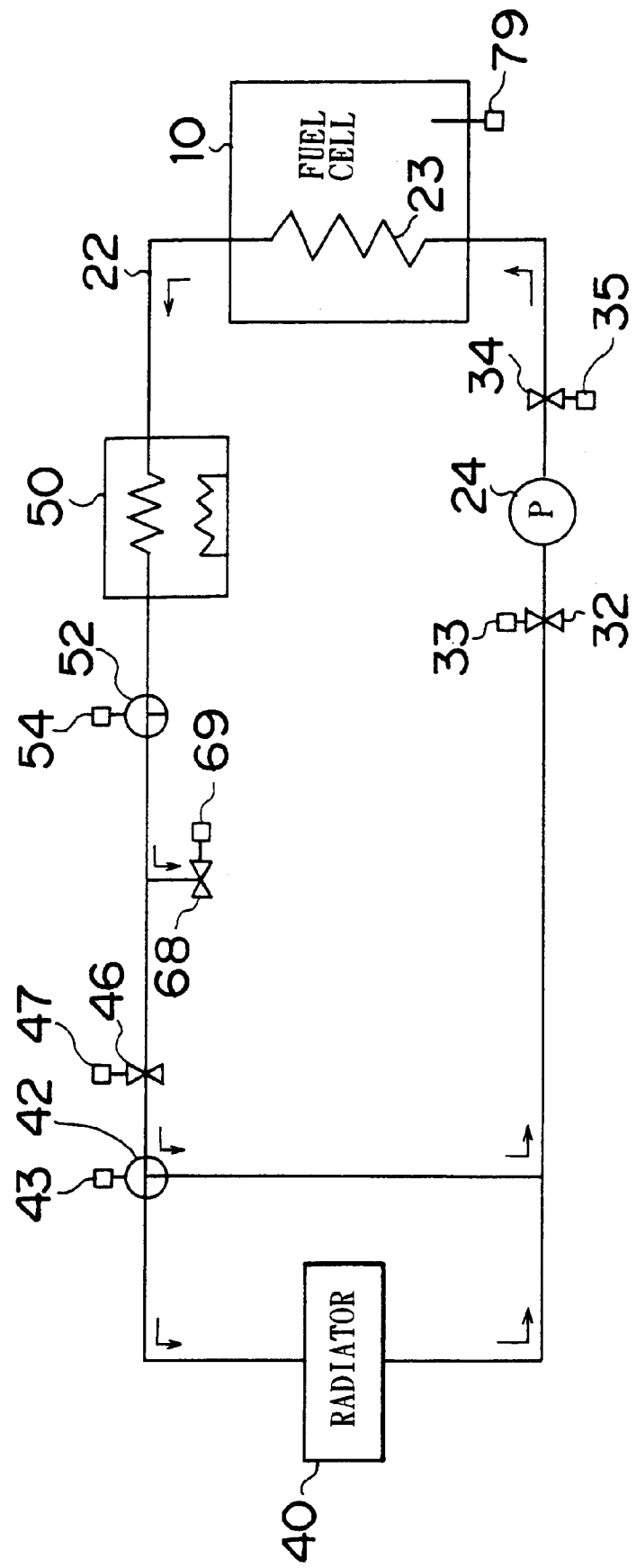
FIG. 4 is an explanatory view exemplifying how heat exchange medium flows when a cooling circuit is formed.

If the temperature Tfc of the fuel cell 10 becomes equal to or higher than the threshold value Tset, the heater 50 is turned off (step S110) and the circulation pump 24 is stopped (step S112). Then, a processing for forming a circulation duct (the cooling circuit) for cooling the fuel cell 10 is performed (step S114), and the present routine is terminated. More specifically, the cooling circuit is formed as follows. The electronic control unit 70 outputs a driving signal to the actuator 54 for the three-way valve 52 so that the heat exchange medium flows to the radiator 40. On the other hand, the electronic control unit 70 outputs driving signals to the actuators 33 and 35 for the electromagnetic valves 32 and 34 so as to open these valves, and outputs driving signals to the actuators 37 and 39 for the electromagnetic valves 36 and 38 so as to close these valves. Thus, the cooling circuit is formed. FIG. 4 shows a state where the cooling circuit is formed. As shown in FIG. 4, if the cooling circuit is formed, the heat exchange medium force-fed by the circulation pump 24 flows through the fuel cell 10, reaches the heater 50, flows through the radiator 40 or the radiator bypass duct 44, and returns to the circulation pump 24. By switching the three-way valve 42, it is chosen whether the heat exchange medium is to flow through the radiator 40 or through the radiator bypass duct 44. This choice is exercised by a routine (not shown) performed by the electronic control unit 70 based on a temperature Tfc of the fuel cell 10 detected by the temperature sensor 79, according to whether or not the heat exchange medium needs to be cooled. In the starting-time processing routine shown in FIG. 2, if the threshold value Tset in step S108 is set lower than a temperature for a normal running state of the fuel cell 10, the fuel cell 10 has not been heated up sufficiently. Thus, the three-way valve 42 in the cooling circuit is so switched as to choose the radiator bypass duct 44.

Figure 5:
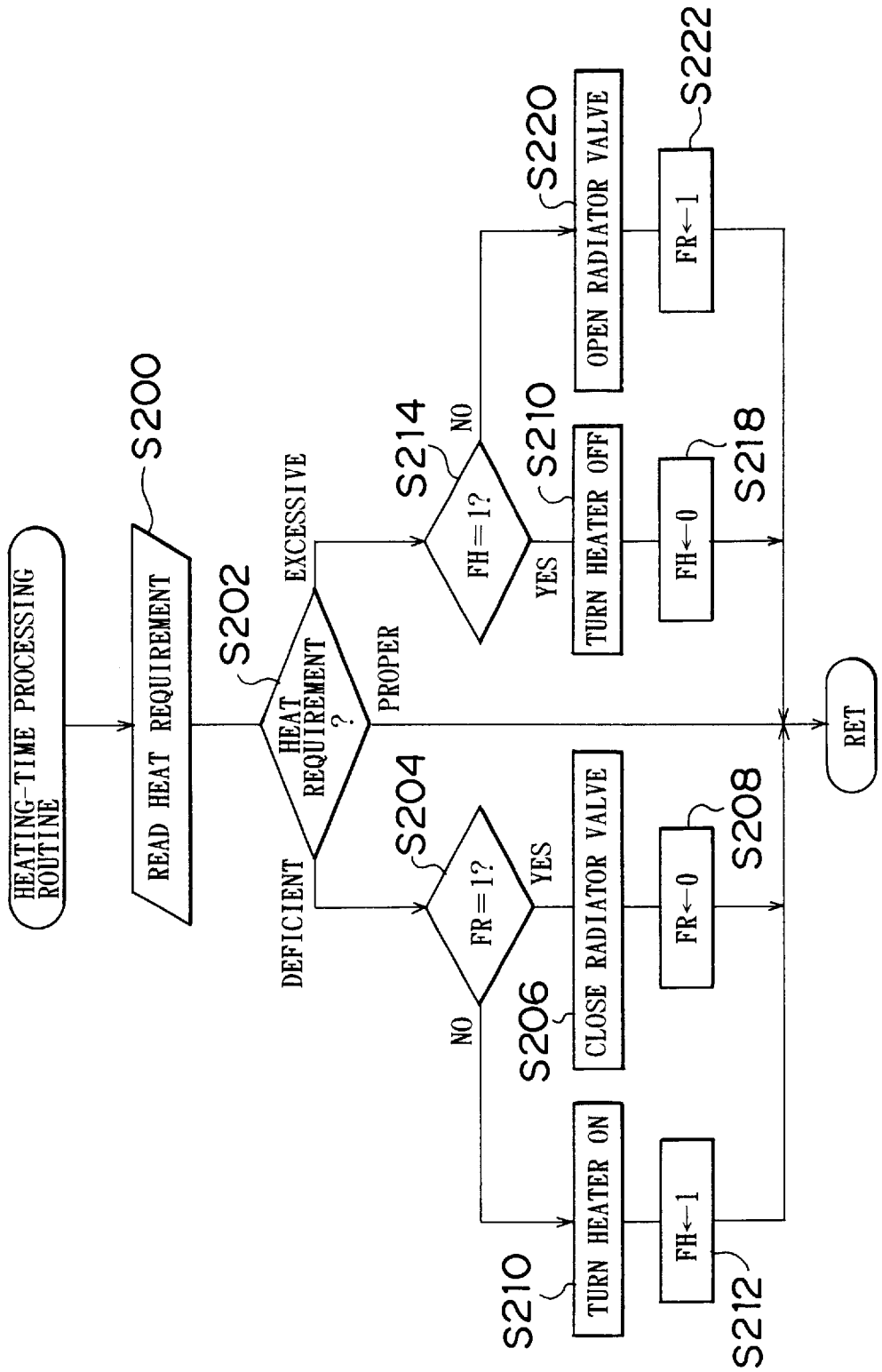
FIG. 5 is a flowchart showing one example of a heating-time processing routine that is carried out by the electronic control unit of the embodiment when a heating device is driven.

Next, an operation which is performed when the heating device 60 is driven will be described. FIG. 5 is a flowchart showing an example of a heating-time processing routine performed by the electronic control unit 70 of the embodiment when the heating device 60 is driven. This routine is repeatedly carried out at intervals of a predetermined length of time (e.g. one second) after a signal for starting the heating device 60 has been inputted from the heating-device electronic control unit 64 through a communication port and the electromagnetic valve 68 disposed in the heat-supplying duct 66 has been opened.

If the heating-time processing routine is performed, the CPU 72 of the electronic control unit 70 first performs a processing of reading a heat requirement outputted from the heating-device electronic control unit 64 (step S200). In the embodiment, the heating-device electronic control unit 64 outputs the heat requirement to the electronic control unit 70 in the form of a signal assuming three values indicative of "appropriate", "deficient" and "excessive", based on, for example, a difference between a temperature in the passenger compartment detected by a temperature sensor provided therein and a target temperature.

If the heat requirement is read, the requirement is judged (step S202). If the result of the judgment is "appropriate", it is determined that an exact amount of heat necessary for the heating device 60 is being supplied, and the present routine is terminated without performing any other processings.

Figure 6:
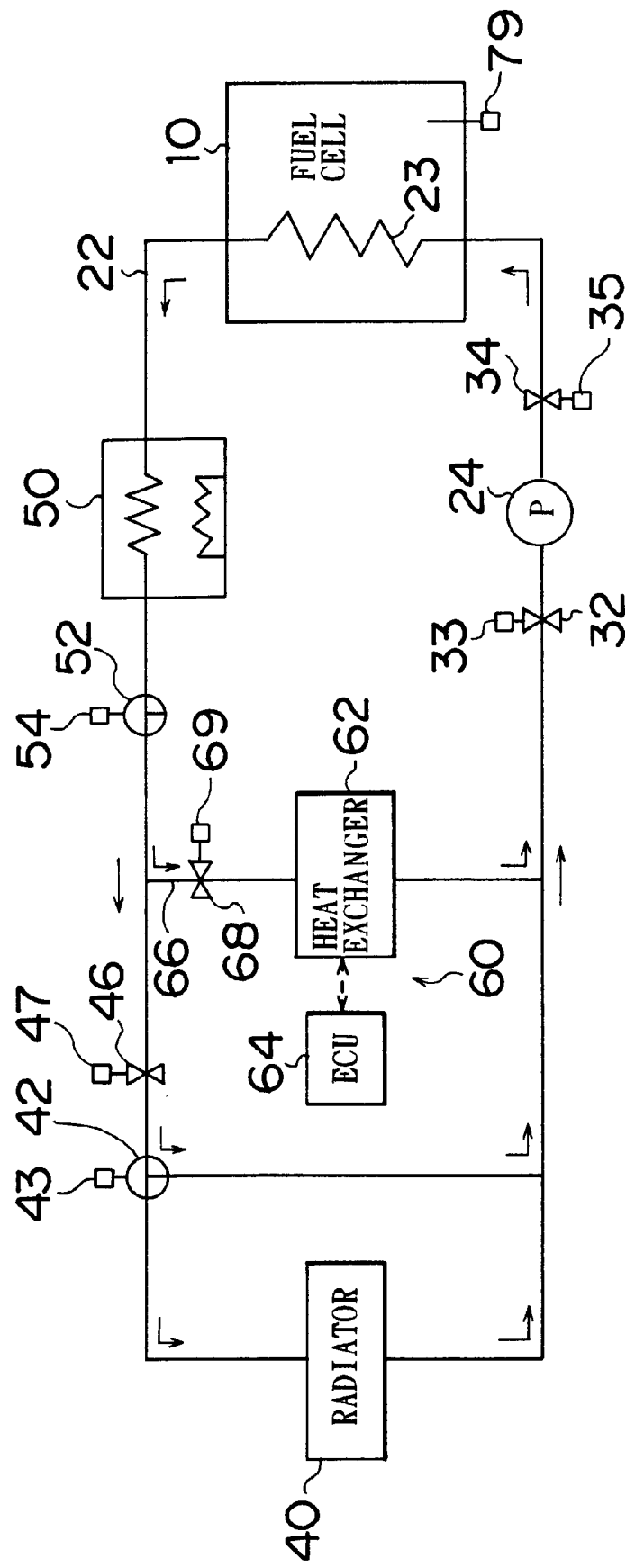
FIG. 6 is an explanatory view exemplifying how heat exchange medium flows when the heating device is driven.
Figure 7:
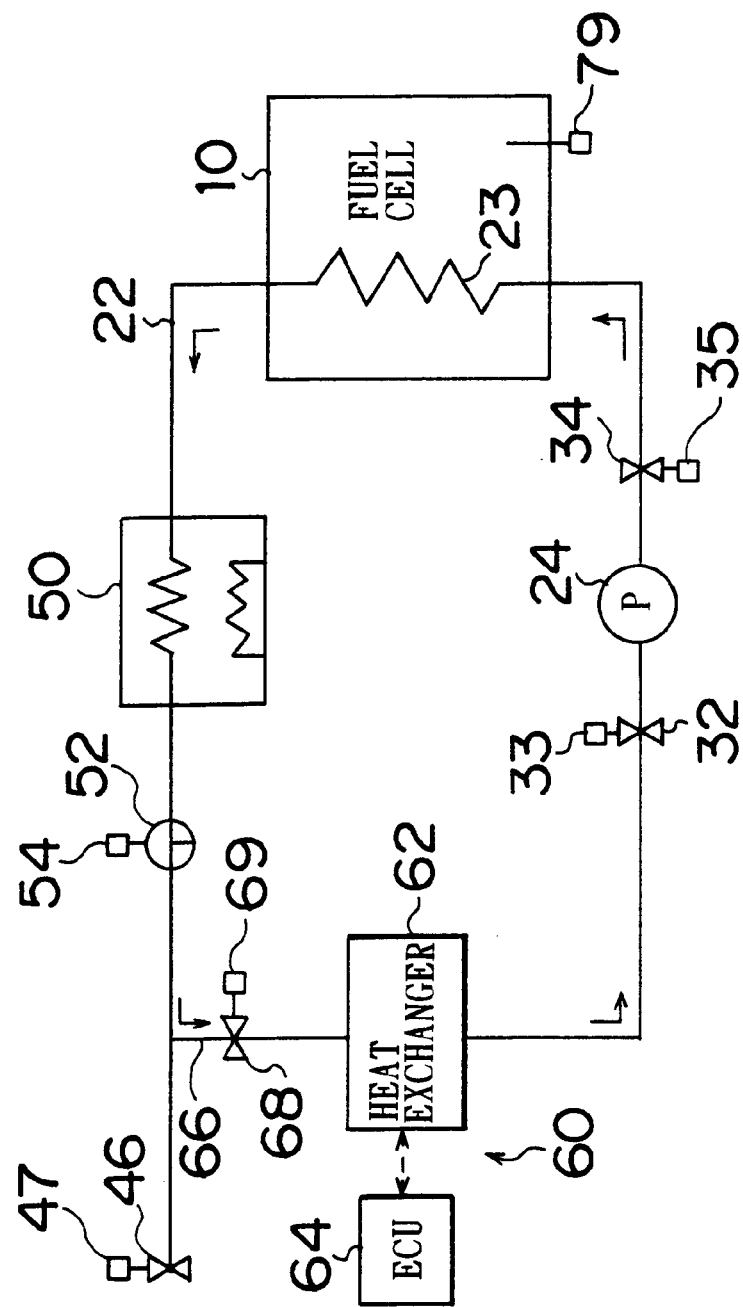
FIG. 7 is an explanatory view exemplifying how heat exchange medium flows when the heating device demands less heat.

If the result of the judgment is "deficient", a processing for checking a radiator flag FR is first performed (step S204). The radiator flag FR assumes a value indicative of whether or not the heat exchange medium is flowing toward the radiator 40. This flag is set in post-processings of the present routine. If the radiator flag FR assumes a value of 1, it is determined that the heat exchange medium is flowing toward the radiator 40. The electromagnetic valve 46 designed as a radiator valve is then closed (step S206) so that all the heat exchange medium is supplied to the heat exchanger 62 through the heat-supplying duct 66. Then, the radiator flag FR is set to 0 (step S208) and the present routine is terminated. By supplying all the heat exchange medium to the heat exchanger 62 of the heating device 60 in this manner, the amount of heat otherwise flowing toward the radiator 40 is supplied to the heating device 60. FIG. 6 shows how the heat exchange medium flows when the electromagnetic valve 46 designed as a radiator valve is opened, and FIG. 7 shows how the heat exchange medium flows when the electromagnetic valve 46 is closed. As described above, the electronic control unit 70 switches the three-way valve 42 shown in FIG. 6 based on a temperature Tfc of the fuel cell 10 detected by the temperature sensor 79.

On the other hand, if the radiator flag FR assumes a value of 0, it is determined that all the heat exchange medium is being supplied to the heat exchanger 62 or that the amount of heat is deficient. The heater 50 is then turned on (step S210), a heater flag FH is set to 1 (step S210), and the present routine is terminated Thus, the amount of heat necessary for the heating device 60 is supplied by turning the heater 50 on and heating the heat exchange medium. The heater flag FH, which is a flag assuming a value indicating whether the heater 50 is on or of is set by the present routine.

If the result of the judgment in step S202 is "excessive", a processing for checking the heater flag FH is first performed (step S214). If the heater flag FH assumes a value of 1, it is determined that the heat exchange medium is flowing as shown in FIG. 7 and being heated by the heater 50. Then, the heater 50 is turned off (step S216), the heater flag FH is set to 0 (step S218), and the present routine is terminated. Because the heater is turned off in this processing, the amount of heat supplied to the heating device 60 decreases. On the other hand, if the heater flag FH assumes a value of 0, it is determined that the amount of heat is excessive even though the heater 50 has been turned off. Then, the electromagnetic valve 46 designed as a radiator valve is opened (step S220), the radiator flag FR is set to 1 (step S222), and the present routine is terminated. Because of this processing, the heat exchange medium flows as shown in FIG. 6 and the amount of heat supplied to the heating device 60 is reduced.

According to the aforementioned temperature regulator 20 of the embodiment, when the fuel cell 10 is started, the heating-time bypass duct 56 bypasses the radiator 40, the flow-direction switching mechanism 26 causes the heat exchange medium to flow through the heater 50 and then through the fuel cell 10, and the heater 50 is turned on to heat the heat exchange medium. Thereby the fuel cell 10 can be heated up efficiently. Further, according to the temperature regulator 20 of the embodiment, after the fuel cell 10 has been started, the device performing the function of heating up the fuel cell 10 can be made to function as a device for cooling the fuel cell 10.

Further, according to the temperature regulator 20 of the embodiment, the passenger compartment can be heated using the heat generated by the fuel cell 10. Besides, if more heat is required to heat the passenger compartment, a deficiency in heat can be remedied by causing all the heat exchange medium to flow into the heat exchanger 62 of the heating device 60 or heating the heat exchange medium by means of the heater 50. As a result, even in the case where the heat generate by the fuel cell 10 is insufficient, for example, in the case where the fuel cell 10 has not been warmed up sufficiently or where outside air temperature is very low and the amount of heat generated by the fuel cell 10 in its normal operational state is deficient, the passenger compartment can be heated sufficiently.

In the temperature regulator 20 of the embodiment, water is used as the heat exchange medium. However, any fluid can be used as long as it functions as the heat exchange medium. For example, other suitable fluids such as an anti-freezing solution of alcohol type and oil can also be used.

In the temperature regulator 20 of the embodiment, the single-direction circulation pump 24 is used. However, a bidirectional pump whose direction of flow can be reversed may also be used. In this case, the flow-direction switching mechanism 26 is unnecessary.

In the temperature regulator 20 of the embodiment, the heater 50 is designed as an electric heater. However, the heater 50 may be designed to heat the heat exchange medium using the heat obtained through combustion of a fuel for the fuel cell 10 or other fuels.

In the temperature regulator 20 of the embodiment, the radiator 40 is designed as a heat exchanger for exchanging heat with outside air. However, any radiator can be used as long as it can cool the heat exchange medium.

In the temperature regulator 20 of the embodiment, the heating device 60 for heating the passenger compartment is used as a heat utilizer that carries out work using the heat generated by the fuel cell 10. However, any other heat utilizer can be used as long as it carries out work using the heat generated by the fuel cell 10. The work mentioned herein does not mean mechanical work but the work defined in the context of thermodynamics.

In the temperature regulator 20 of the embodiment, a polymer electrolyte fuel cell is used as the fuel cell 10. Other fuel cells such as a phosphoric acid type fuel cell may also be used. In the temperature regulator 20 of the embodiment, the fuel cell 10 is installed in a motor vehicle. However, the temperature regulator 20 may be designed to regulate a fuel cell of any other type.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. A temperature regulator for regulating a temperature of a fuel cell, comprising:
   a circulation circuit through which a heat exchange medium exchanging heat with the fuel cell circulates;
   a medium circulator for circulating the heat exchange medium through the circulation circuit either in a normal direction or in a reverse direction;
   a cooler provided in the circulation circuit;
   a cooling bypass device positioned to switch the circulation circuit such that the heat exchange medium bypasses the cooler;
   a heat utilizer provided in the circulation circuit to carry out work by utilizing heat of the heat exchange medium;
   a heat utilizing bypass device positioned to switch the circulation circuit such that the heat exchange medium bypasses the heat utilizer; and
   a heater provided adjacent to the fuel cell in the circulation circuit and capable of heating the heat exchange medium.

2. The temperature regulator according to claim 1, comprising:
   a state detector for detecting a state of the fuel cell; and
   a controller designed to control the medium circulator, the cooling bypass device, the heat utilizing bypass device and the heater, based on the state detected by the state detector.

3. The temperature regulator according to claim 2, wherein:
   the controller is designed to control the cooling bypass device and the heat utilizing bypass device such that the circulation circuit bypasses the cooler and the heat utilizer, when the state detector detects a starting state of the fuel cell; and
   the controller is designed to control the heater such that the heat exchange medium is heated, and to control the medium circulator such that the heat exchange medium circulates through the circulation circuit in the respective order of the heater and the fuel cell.

4. The temperature regulator according to claim 3, wherein: the heat utilizer is a heating device that carries-out heating by exchanging heat with the heat exchange medium.

5. The temperature regulator according to claim 2, wherein:
   the controller is designed to control the cooling bypass device and the heat utilizing bypass device so as to incorporate at least one of the cooler and the heat utilizer into the circulation circuit when the state detector detects an operable state of the fuel cell; and
   the controller is designed to control the medium circulator such that the heat exchange medium circulates through the circulation circuit in the respective order of the fuel cell, the heater and at least one of the cooler and the heat utilizer.

6. The temperature regulator according to claim 5, wherein:
   the state detector is provided with a temperature detector for detecting a temperature of the fuel cell; and
   the controller is designed to control the medium circulator, the cooling bypass device the heat utilizing bypass device and the heater such that the temperature detected by the temperature detector is confined to a desired temperature range.

7. The temperature regulator according to claim 6, further comprising:
   a heat utilizing state detector for detecting a state of the heat utilizer, wherein:
   the controller is designed to control the cooling bypass device, the heat utilizing bypass device and the heater, based on the state of the heat utilizer detected by the heat utilizing state detector.

8. The temperature regulator according to claim 7, wherein:
   the controller is designed to control the heat utilizing bypass device so as to incorporate the heat utilizer into the circulation circuit, when the heat utilizing state detector detects a state where the heat utilizer utilizes heat.

9. The temperature regulator according to claim 8, wherein:
   the heat utilizer is provided with an information detector for detecting information on excess and deficiency of a required amount of heat; and
   the controller is designed to control the heater and the cooling bypass device based on the information detected by the information detector.

10. The temperature regulator according to claim 9, wherein:
    the controller is designed to control the heater such that the heat exchange medium is heated when the information detector detects information on a deficiency of a required amount of heat.

11. The temperature regulator according to claim 10, wherein:
    the heat utilizer is a heating device that carries out heating by exchanging heat with the heat exchange medium.

12. The temperature regulator according to claim 9, wherein:
    the controller is designed to control the heater such that the heat exchange medium is not heated when the information detector detects information on a excess of a required amount of heat.

13. The temperature regulator according to claim 12, wherein:

the controller is designed to control the cooling bypass device so as to incorporate the cooler into the circulation circuit when the information detector detects both information on an excess of a required amount of heat and that the heater is controlled so as not to heat the heat exchange medium.

14. The temperature regulator according to claim 13, wherein:

the controller is designed to control the cooling bypass device such that the circulation circuit bypasses the cooler prior to the heating of the heat exchange medium by the heater when the information detector detects information on a deficiency of a required amount of heat with the cooling bypass device being so controlled as to incorporate the cooler into the circulation circuit.

15. The temperature regulator according to claim 14, wherein:

the heat utilizer is a heating device that carries out heating by exchanging heat with the heat exchange medium.

16. The temperature regulator according to claim 13, wherein:

the heat utilizer is a heating device that carries out heating by exchanging heat with the heat exchange medium.

17. The temperature regulator according to claim 12, wherein:

the heat utilizer is a heating device that carries out heating by exchanging heat with the heat exchange medium.

18. The temperature regulator according to claim 9, wherein:

the heat utilizer is a heating device that carries out heating by exchanging heat, with the heat exchange medium.

19. The temperature regulator according to claim 8, wherein:

the heat utilizer is a heating device that carries out heating by exchanging heat with the heat exchange medium.

20. The temperature regulator according to claim 7, wherein:

the heat utilizer is a heating device that carries out heating by exchanging heat with the heat exchange medium.

21. The temperature regulator according to claim 6, wherein:

the heat utilizer is a heating device that carries out heating by exchanging heat with the heat exchange medium.

22. The temperature regulator according to claim 5, wherein:

the heat utilizer is a heating device that carries out heating by exchanging heat with the heat exchange medium.

23. The temperature regulator according to claim 2, wherein:

the heat utilizer is a heating device that carries out heating by exchanging heat with the heat exchange medium.

24. The temperature regulator according to claim 1, wherein:

the heat utilizer is a heating device that carries out heating by exchanging heat with the heat exchange medium.

\* \* \* \* \*

UNITED STATES PATENT AND TRADEMARK OFFICE
CERTIFICATE OF CORRECTION

PATENT NO.    : 6,383,672 B1
DATED         : May 7, 2002
INVENTOR(S)   : Fujita

It is certified that error appears in the above-identified patent and that said Letters Patent is hereby corrected as shown below:

<u>Title page,</u>
Item [73], the Assignee information is listed incorrectly. It should read as follows:

-- [73]  Assignee:  Toyota Jidosha Kabushiki Kaisha,
                    Toyota (JP) --

Signed and Sealed this

Twenty-second Day of October, 2002

*Attest:*

*Attesting Officer*

JAMES E. ROGAN
*Director of the United States Patent and Trademark Office*